(12) United States Patent
Kamiya et al.

(10) Patent No.: US 6,401,028 B1
(45) Date of Patent: Jun. 4, 2002

(54) POSITION GUIDING METHOD AND SYSTEM USING SOUND CHANGES

(75) Inventors: Tsuyoshi Kamiya; Takashi Mizokawa; Hirofumi Mochizuki, all of Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 0 days.

(21) Appl. No.: 09/824,172

(22) Filed: Apr. 2, 2001

(30) Foreign Application Priority Data

Oct. 27, 2000 (JP) ........................................ 2000-329643

(51) Int. Cl.[7] .............................................. G08G 1/123
(52) U.S. Cl. ....................... 701/200; 701/208; 701/211; 701/213; 340/990; 340/995
(58) Field of Search ................................ 701/200, 213, 701/208, 211; 340/990, 995

(56) References Cited

U.S. PATENT DOCUMENTS

| | | | | |
|---|---|---|---|---|
| 5,501,222 A | * | 3/1996 | Briggs | 600/453 |
| 5,657,760 A | * | 8/1997 | Ying et al. | 600/439 |
| 5,999,630 A | * | 12/1999 | Iwamatsu | 381/17 |

* cited by examiner

Primary Examiner—William A. Cuchlinski, Jr.
Assistant Examiner—Olga Hernandez
(74) Attorney, Agent, or Firm—Knobbe, Martens, Olson & Bear, LLP

(57) ABSTRACT

A system guides a user (or a vehicle 100) in reference to a target position via sound changes. The system (i) virtually disposes a sound source at the target position defined in a geographical data field covering the positional arrangement of the user and the target object, and (ii) actually outputs simulated sounds to the user as if the target position emitted sounds and the sounds were propagated from the target position to the user at the current position. The sounds change as the user moves in the geographical data field. For example, sound propagation paths, through which sound waves from the sound source are propagated to the user while being influenced by other objects or obstacles, are calculated based on positional data from a position detection system 10. Simulated sounds expressed by combining directly transmitted waves, diffraction waves, and reflection waves, which arrive at the user through the sound propagation paths, are generated, and the generated sounds are outputted from multiple speakers 34a to 34d in such a way that the three-dimensional position of the sound source can be identified.

26 Claims, 8 Drawing Sheets

POSITION GUIDING METHOD AND SYSTEM USING SOUND CHANGES

BACKGROUND OF THE INVENTION

1. Field of the Invention

The present invention relates to a system to guide a user to a destination object such as a surrounding plot of ground or a building via sound changes as the user moves. The invention particularly relates to a position guiding system, a position guiding method, and a sonic navigation system, which are suitable for sensorially understanding the positional relation between a destination object and the current position of the user via sound changes in an environment crowded with other objects or obstacles such as buildings.

2. Description of the Related Art

Conventionally, as systems to guide a user to a plot of ground or building in the vicinity of a target destination when a vehicle is traveling as well as to guide a user to the destination which a passenger heads for as the vehicle moves, a so-called car navigation system is widely known, and there was, for example, a navigation system loaded on a vehicle as released in the Japanese Patent Laid-open No. H10-197264.

This navigation system loaded on a vehicle possesses a CD-ROM which stores map data, a microprocessor which reads map data of a block surrounding the current position from the CD-ROM by calculating the current position of the vehicle using various sensors, a display processor which displays a map of a block surrounding the current position together with the current position on a display, and a sound generating device. The microprocessor has a function to set up any point on the map as a registered point on the instruction of a user and a function to detect a registered point within a given range from the current position. The sound generating device outputs an alarm sound from a speaker when a registered point is detected by the microprocessor.

Thus, even while driving a vehicle, a user can determine a registered point near the current position by a sound.

The present inventors have recognized problems residing in the conventional navigation systems. That is, in the case of the above-mentioned conventional navigation system loaded on a vehicle since its configuration is only to notify a user by a sound such as an alarm sound when a registered point which is a destination object enters within a given range from the current position of the vehicle, the user could know that the destination object was within a given range, but that was all that could be understood. It was difficult for the user to sensorially understand the relation between the destination object and the current position, such as how long it would take from the current position to the destination object.

For this reason, to ultimately lead the user to a destination, it was necessary to signify a route to the destination object by a sound or to show the destination object on a map on the display. In the former case, the user had to understand a route read aloud without any visual aid, and in the latter case, the user had to look at the display carefully.

Accordingly, a configuration in which a sound such as an alarm sound, etc. is outputted at a sound volume corresponding to a distance of a destination object from the current position can be considered. According to such a configuration, when a destination object enters within a given range from the current position of the vehicle, the nearer to the destination object the vehicle is, the higher the sound volume becomes. Conversely, the more distant from the destination object the vehicle is, the lower the sound volume becomes. Hence, the user can understand the positional relation between a destination object and the current position sensorially to some extent.

If a sound such as an alarm sound, etc. is outputted simply at a sound volume corresponding to the distance between a destination object and the current position, a realistic sense of distance to the destination object could be felt if the destination object is located in an open suburb. However, if the destination object, is located in a city crowded with many buildings, for example, at the rear of a building, a sense of distance to the destination object could be felt differently. In other words, to feel realistically a distance to a destination object in an environment crowded with many buildings, it is important to be able to understand not only the distance to the destination object but also geographical conditions of blocks surrounding the destination object.

SUMMARY OF THE INVENTION

The present invention is accomplished by taking notice of unsolved problems which these conventional techniques have. Among others, an object of the present invention is to provide a position guiding system, a position guiding simulation and navigation system and a position guiding method which are suitable for sensorially understanding the positional relation between a destination object and the current position in an environment crowded with many buildings by giving consideration to the distance to the destination object and the geographical conditions of a block around it.

To achieve the above-mentioned object, a position guiding method according to an embodiment of the present invention is a position guiding method which guides a user in reference to the positional arrangement of a target object, via sound changes as the user's observation point moves, by (i) virtually disposing a sound source at the target object in a geographical data field, and (ii) outputting a simulation of sounds from the target object calculated in the geographical data field as if the target object actually emitted sounds. The method may (a) simulate actual propagation paths through which sound waves from the target object are propagated to the observation point while being influenced by objects or obstacles, and (b) considering the propagation paths, synthesize and output a simulation of sounds from the target object which the user would hear at the current observation point if the target object actually emitted sounds.

In this method, as the observation point moves, a simulation of sounds from the target object which would be heard at the observation point is generated and outputted, giving consideration to propagation paths through which sound waves from a sound source are propagated while being influenced by objects or obstacles.

Consequently, because propagation paths, through which sound waves from the target object are propagated while being influenced by objects or obstacles, are considered when sounds are synthesized, the positional relation between the positional arrangement of the target object and the observation point can be understood sensorially, including the geographical conditions of blocks surrounding the positional arrangement of the target object (the positional arrangement and size of the target object). In the above, the user hears actual sounds but, of course, the target object does not emit actual sounds. Simulation is conducted using a computer, and the actual geographical conditions are virtually reproduced in the computer, wherein the user and the target object are located in a geographical data field, and the target object emits sounds.

The geographical data filed may be in the form of a simulation map, preferably a three-dimensional simulation map. However, the geographical data field need not be visible to a user, as long as the user can input the coordinates of target objects in relation to the position of the user. The coordinates can be defined by the address, for example, which can be inputted by oral instructions or using a keyboard. If the geographical data field is displayed on a monitor, the user can select the target objects on the monitor. The geographical data field covers the positional arrangement of the user and the target object(s). The geographical data field can be configured using a GPS (Global Positioning System) using an orbiting satellite, a PHS (Personal Phone System) using many relay antennas, or any other means for identifying the positional arrangement of the user and the target objects. When the system receives positional signals of the user and the target objects, the system can configure the geographical data field using a database of a geographic information. The database can be preloaded in the system or can be obtained by accessing external sources via the Internet, etc.

Synthesized sounds can be outputted using speakers which can be installed in a vehicle itself, a helmet (e.g., for a motorbike), or a headset or headphone. Preferably, the system is installed in a vehicle, but the system can be portable.

Further, to achieve the above-mentioned purpose, a position guiding method according to another embodiment of the present invention is a method which guides a user in reference to the positional arrangement of a target object, via sound changes as the user's observation point moves, by virtually disposing a sound source at a target object and by generating and outputting a simulation of sounds from the target object as if the sounds were emitted from the target object, which method comprises the step of (i) configuring a geographical data field in a computer system, (ii) designating a target object in the geographical data field as a sound source, (iii) designating an observation point in the geographical data field, (iv) defining the propagation of a sound from the sound source to the observation point as a sound signal which is a function of at least a distance from the sound source to the current observation point, (v) separating a sound signal arriving at the observation point into multiple audio element signals according to the direction of the sound source observed from the observation point, and (vi) reproducing and outputting to the user the multiple audio element signals whereby the user sensorially recognizes the position of the target object from the current observation point.

The present invention can also be applied to a position guiding system for guiding a user with reference to a target object via sound changes, comprising: (a) a positional information detector which obtains positional information for locating the position of the user's observation point in a geographical data field; (b) a geographical data field-user interface which virtually disposes a sound source at the target object in a geographical data field; (c) a propagation path calculation unit which identifies propagation paths, through which sound waves from the target object are propagated to the observation point, based on the positional information obtained by the positional information detector, (d) a sound synthesizer which synthesizes a simulation of sounds as if the target object actually emitted sounds and the sounds were propagated to the user's current observation point via the propagation paths, and (e) multiple sound output devices which outputs the synthesized sounds, said multiple sound output devices being arranged in different positions with respect to the positions of the user's ears to enable the user to sensorially recognize the positional arrangement of the target object.

For purposes of summarizing the invention and the advantages achieved over the prior art, certain objects and advantages of the invention have been described above. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

Further aspects, features and advantages of the present invention will become apparent from the detailed description of the preferred embodiments which follow.

BRIEF DESCRIPTION OF THE DRAWINGS

These and other features of the present invention will now be described with reference to the drawings of preferred embodiments which are intended to illustrate and not to limit the invention.

Figure 1A:
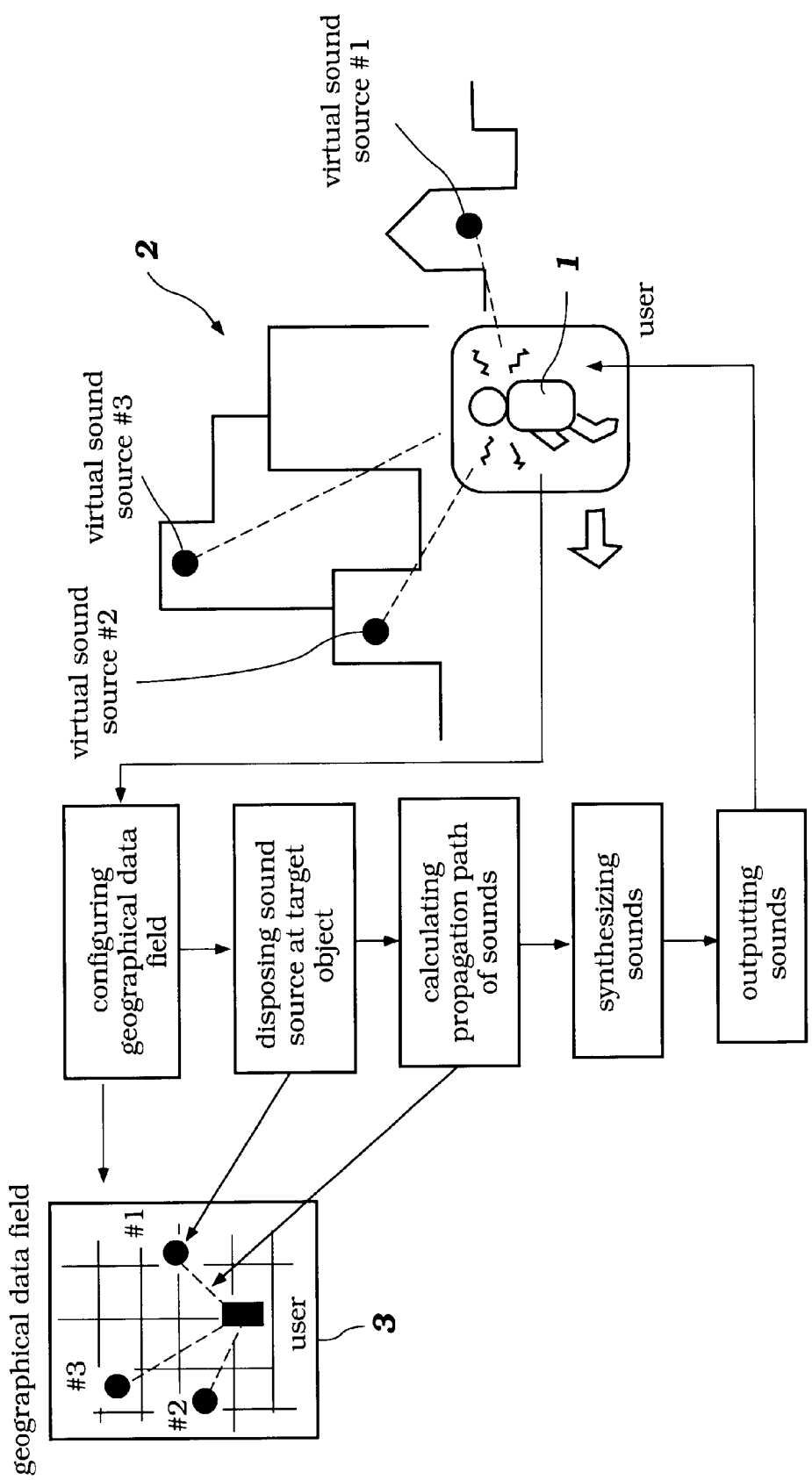
FIG. 1a is a schematic diagram showing an embodiment of the present invention.

In the drawings, numeral 10 is a position detection system, 20 is a sound generation unit, 22 is a target object extraction unit, 24 is a propagation path calculation unit, 26 is a sound synthesizing unit (synthesizer), 30 is a sound output unit, each of 32a to 32d is an amplifier, each of 34a to 34d is a speaker, 40 is an input device, 42 is a notification conditions setting unit, 44 is a notification conditions memory unit, 50 is a sound input device, 52 is a map data registration DB, 54 is a sound data registration DB, 56 is a sound registration unit, 70 is a CPU, 72 is a ROM, 74 is a RAM, 79 is a bus, 80 is a map data input device, each of 41, 51, and 81 is I/F, 90 is a navigation system, 92 is a display.

DETAILED DESCRIPTION OF THE PREFERRED EMBODIMENT

The present invention includes various embodiments, one of which is a position guiding method for guiding a user in reference to a target object via sound changes as the user's observation point moves, comprising the steps of: (i) virtually disposing a sound source at the target object in a geographical data field covering the positional arrangement of the user and the target object; (ii) calculating propagation paths in real time through which sound waves from the target object are propagated to the observation point in the geographical data field, based on geographical conditions defined in the geographical data field; and (iii) synthesizing and outputting a simulation of sounds as if the target object actually emitted sounds and the sounds were propagated to the user's current observation point, using the calculated propagation paths. The present invention is not limited to this embodiment but includes other embodiments described below. The embodiment numbers indicated below are simply for convenience and in no way limit the scope of the present invention. The elements described in each embodiment are interchangeable between embodiments and can be used in any combination.

In a first embodiment of the present invention, a position guiding system guides a user in reference to the positional arrangement of a target object, via sound changes as the user's observation point moves, by (i) virtually disposing a sound source at the target object in a geographical data field, and (ii) outputting a simulation of sounds from the target object calculated in the geographical data field as if the target object actually emitted sounds. The system may (a) simulate actual propagation paths through which sound waves from the target object are propagated to the observation point while being influenced by objects or obstacles, and (b) considering the propagation paths, synthesize and output a simulation of sounds from the target object which the user would hear at the current observation point if the target object actually emitted sounds. This embodiment can be illustrated in FIG. 1a. In this figure, a user 1 moves in a town where several buildings 2 are constructed. The system configures a geographical data field 3 (a three-dimensional map) covering the positional arrangement of the user and disposes a sound source at a target object. Sounds emitted from the sound source is pre-selected. Here, user selected three target objects. The final destination is target object #3, but by using multiple target objects, it can be easier for the user to understand the position of the user in relation to the final destination. The system then calculates propagation paths of sounds and synthesizes a simulation of sounds as if the target objects emitted sounds and the sounds were propagated to the user in the real world. Factors to be considered to formulate a simulation of sounds may include the distance between the user and each target object, the arrangement of obstacles and other objects, and the user's moving velocity and direction. The synthesized sounds are inputted to the user using speakers. The above processes are conducted in real time as the user moves.

In this configuration, as the observation point moves, a simulation of sounds from the target object which would be heard at the observation point is generated and outputted, giving consideration to propagation paths through which sound waves from a sound source are propagated while being influenced by objects or obstacles.

Consequently, because propagation paths, through which sound waves from the target object are propagated while being influenced by objects or obstacles, are considered when sounds are synthesized, the positional relation between the positional arrangement of the target object and the observation point can be understood sensorially, including the geographical conditions of blocks surrounding the positional arrangement of the target object (the positional arrangement and size of the target object). In the above, the user hears actual sounds but, of course, the target object does not emit actual sounds. Simulation is conducted using a computer, and the actual geographical conditions are virtually reproduced in the computer, wherein the user and the target object are located in a geographical data field, and the target object emits sounds.

Herein, a sound is outputted as an observation point moves. It is, however, acceptable if a sound can be outputted at least with the movement, and even if a movable observation point stands still, a sound can be outputted by generating a sound from a target object which would be observed at the observation point. The same applies to a position guiding system of a $3^{rd}$ embodiment of the present invention described below, a position guiding simulation system of a $9^{th}$ embodiment of the present invention, and a navigation system of a $10^{th}$ embodiment of the present invention.

Alternatively, an observation point can be an observation point in the real world or an observation point in the virtual world. In the former case, for example, if the system is loaded on a vehicle, it can be used as a navigation system. In the latter case, for example, if it is applied to a computer simulation, it can be used as a position guiding system in virtual space.

Additionally, sounds are not limited to sounds uttered by human beings and animals, and they include songs, musical compositions, and sound effects. The same applies to a position guiding system of the $3^{rd}$ embodiment described below, a position guiding simulation system of the $9^{th}$ embodiment described below, and a navigation system of the $10^{th}$ embodiment described below.

Furthermore, a position guiding system according to a $2^{nd}$ embodiment of the present invention is a position guiding system of the $1^{st}$ embodiment of the present invention, wherein (i) propagation paths, through which sound waves from a target object are propagated to a user's observation point while being influenced by objects or obstacles, are identified, (ii) simulated sounds are synthesized by indirectly transmitted waves which arrive at the observation point via propagation paths or by combining the directly transmitted waves and indirectly transmitted waves if there are propagation paths through which sound waves from the target object are directly propagated to the observation point, and (iii) synthesized sounds are outputted so that the target object can sensorially be recognized.

In this configuration, as an observation point moves, propagation paths, through which sound waves from a target object are propagated to an observation point while being influenced by objects or obstacles, are identified, simulated sounds expressed by indirectly transmitted waves which arrive at the observation point via the identified propagation paths are generated and generated sounds are outputted so that the target object can sensorially be recognized. Additionally, if there are propagation paths through which sound waves from a target object are directly propagated to an observation point, simulated sounds expressed by combining these directly transmitted waves and indirectly transmitted waves are generated, and generated sounds are outputted so that the target object can sensorially be recognized.

Consequently, because indirectly transmitted waves and synthesized signals of directly transmitted waves and indirectly transmitted waves are considered when sounds are outputted, the positional relation between the positional arrangement of a target object and an observation point can be understood sensorially together with the geographical conditions of blocks surrounding the positional arrangement of the target object.

Herein, 'indirectly transmitted waves' mean sound waves from a target object, which arrive at an observation point while being influenced by objects or obstacles, and include, for example, (i) diffraction waves which are sound waves from the target object propagated to the observation point while being diffracted by objects or obstacles, (ii) reflection waves which are sound waves from the target object propagated to the observation point while being reflected by objects or obstacles, and/or (iii) interference waves caused by combining diffraction waves and reflection waves. The same applies to a position guiding system of the $3^{rd}$ embodiment of the present invention described below, a position guiding simulation system of the $9^{th}$ embodiment of the present invention described below, and a navigation system of the $10^{th}$ embodiment described below.

Additionally, 'a sound is outputted so that the target object can sensorially be recognized' means that a sound is outputted so that the direction of a target object can be identified. The same applies to a position guiding system of the $3^{rd}$ embodiment described below, a position guiding simulation system of the $9^{th}$ embodiment described below, and a navigation system of the $10^{th}$ embodiment described below.

Furthermore, a position guiding system of the $3^{rd}$ embodiment is a system which guides a user in reference to positions in the real world corresponding to the positional arrangement of a sound source, via sound changes as the user's observation point in the real world moves, by virtually disposing a sound source at the target object in a geographical data field and by generating and outputting a simulation of sounds from the target object as if the sounds were emitted from the target object, wherein the system comprises (a) a positional information detector which obtains positional information for locating the position of the observation point, (b) a sound generator which generates a simulated sounds from the target object based on the positional information obtained by the positional information detector, and (c) multiple sound output devices which are arranged in different positions with respect to the positions of the user's ears. The sound generator (i) identifies propagation paths, through which sound waves from the target object are propagated to the observation point while being influenced by objects, based on the positional information obtained by the positional information detector, and (ii) generates simulated sounds expressed by indirectly transmitted waves which arrive at the observation point via the propagation paths or by combining these directly transmitted waves and the indirectly transmitted waves if there are propagation paths through which sound waves from the target object are directly propagated to the observation point. The multiple sound output devices outputs the generated sounds in such a way that the target object can sensorially be recognized.

In this configuration, as an observation point in the real world moves, positional information is obtained by a positional information detector, propagation paths, through which sound waves from a target object are propagated while being influenced by objects or obstacles, are identified based on the positional information obtained, simulated sounds expressed by indirectly transmitted waves which arrive at the observation point via the identified propagation paths are generated, and generated sounds are outputted from multiple sound output devices in such a way that the target object can sensorially be recognized. Alternatively, if there are propagation paths through which sound waves from the target object are directly propagated to the observation point, simulated sounds expressed by combining these directly transmitted waves and indirectly transmitted waves are generated, and generated sounds are outputted from the multiple sound output devices in such a way that the target object can sensorially be recognized.

Consequently, because indirectly transmitted waves and synthesized signals of directly transmitted waves and indirectly transmitted waves are considered when sounds are outputted, the positional relation between the positions in the real world corresponding to the positional arrangements of a sound source and an observation point can be sensorially understood together with the geographical conditions of blocks surrounding the positional arrangement of the target object (the positional arrangement and size of an object).

Additionally, as a way of detecting positional information, for example, the positional information can be obtained by setting a communication terminal, which is capable of communicating with an observation point to detect the position of an observation point. The positional information can be also obtained by detecting the position of an observation point using a GPS (Global Positioning System), etc. at the observation point or by calculating it using a communication terminal based on detected information from the observation point. Alternatively, the positional information can be obtained by detecting the position of an observation point using a base station connected to the observation point or by calculating it using a communication terminal based on detected information from the base station. The same applies to a navigation system of the $10^{th}$ embodiment described below.

Furthermore, a position guiding system according to a $4^{th}$ embodiment of the present invention is a position guiding system of the $3^{rd}$ embodiment, wherein the indirectly transmitted waves are either or both of diffraction waves which are sound waves from the target object propagated to the observation point while being diffracted by objects or obstacles, and/or reflection waves which are sound waves from the target object propagated to the observation point while being reflected by objects or obstacles.

In this configuration, by use of a sound generator, simulated sounds expressed by diffraction waves or reflection waves which arrive at the observation point via the identified propagation paths can be generated. Alternatively, if there are propagation paths through which sound waves from the target object are directly propagated to the observation point, simulated sounds expressed by combining directly transmitted waves, diffraction waves or reflection waves are generated.

Consequently, because diffraction waves or reflection waves, or synthesized signals of directly transmitted waves and diffraction waves or reflection waves are considered when sounds are outputted, the positional relation between the positions in the real world corresponding to the positional arrangements of a sound source and an observation point can be understood sensorially together with the geographical conditions of blocks surrounding the positional arrangement of the target object.

Furthermore, a position guiding system of a $5^{th}$ embodiment of the present invention is a position guiding system of the $3^{rd}$ embodiment or the $4^{th}$ embodiment, wherein the sound source is virtually disposed corresponding to the position of a destination object in the real world.

In this configuration, the positional relation between the positions of a destination object in the real world and an observation point can be sensorially understood from the outputted sounds.

Herein, 'destination objects' mean, for example, plots of ground such as parks and public roads, structures such as buildings and statues, features of nature such as hills and rivers and all others which can become objects.

Furthermore, a position guiding system according to a $6^{th}$ embodiment of the present invention is a position guiding system of any one of the $3^{rd}$ to $5^{th}$ embodiments, wherein the Doppler effect is added to the sounds expressed by indirectly transmitted waves or by combining the directly transmitted waves and the indirectly transmitted waves.

In this configuration, by a sound generator, the Doppler effect is added to the sounds expressed by indirectly transmitted waves or by combining the directly transmitted waves and the indirectly transmitted waves.

Consequently, if an observation point moves, the positional relation between the positions of a destination object in the real world and an observation point can be more sensorially understood together with the geographical conditions of blocks surrounding the positional arrangement of a target object.

Herein, a sound generator can possess any configuration if the Doppler effect is added to the sounds expressed by indirectly transmitted waves or by combining the directly transmitted waves and the indirectly transmitted waves. For example, the Doppler effect according to the moving velocity of an observation point can be added to the sounds expressed by indirectly transmitted waves or by combining the directly transmitted waves and the indirectly transmitted waves, or the Doppler effect corresponding to a moving velocity unrelated to the moving velocity of an observation point can be added. The same applies to a navigation system of the $10^{th}$ embodiment described below.

Alternately, a sound generator can add the Doppler effect to the sounds independently of the movement of an observation point, i.e., even when the observation point stands still. From the point of view of sensorially understanding the positional relation between the position in the real world corresponding to the positional arrangement of a sound source and the observation point, it is preferred that the Doppler effect is added as the observation point moves. The same applies to a navigation system of the $10^{th}$ embodiment described below.

Furthermore, a position guiding system according to a $7^{th}$ embodiment of the present invention is a position guiding system of the $6^{th}$ embodiment, wherein a velocity detector which detects the moving velocity of the observation point is provided, and the sound generator adds the Doppler effect to the sounds expressed by indirectly transmitted waves or by combining the directly transmitted waves and the indirectly transmitted waves based on the moving velocity detected by the velocity detector.

In this configuration, the moving velocity of an observation point can be detected by the velocity detector, and the Doppler effect is added to the sounds expressed by indirectly transmitted waves or by combining directly transmitted waves and the indirectly transmitted waves by a sound generator based on the detected moving velocity detected.

Furthermore, a position guiding system according to an $8^{th}$ embodiment of the present invention is a position guiding system of the $6^{th}$ embodiment, wherein the sound generator adds the Doppler effect according to a velocity unrelated to the moving velocity of the observation point to the sounds expressed by the indirectly transmitted waves or by combining the directly transmitted waves and the indirectly transmitted waves, when a distance between the observation point and the sound source becomes less than a given range.

In this configuration, when a distance between an observation point and a sound source becomes less than a given range, the sound generator adds the Doppler effect according to a velocity unrelated to the moving velocity of the observation point to the sounds expressed by the indirectly transmitted waves or by combining the directly transmitted waves and the indirectly transmitted waves.

Consequently, because the Doppler effect is added to an output sound more emphatically than a sound felt at an actual moving velocity when a distance between an observation point and a sound source becomes less than a given range, a user can direct his attention to a fact that the position in the real world corresponding to the positional arrangement of a target object is approaching.

Additionally, to achieve the above-mentioned purpose, a position guiding simulation system according to the $9^{th}$ embodiment of the present invention is a system which a position guiding system of either of the $1^{st}$ or $2^{nd}$ embodiments is applied to a position guiding simulation to guide a user in reference to the position of a destination object disposed in virtual space by the movement of a movable body in virtual space, and the observation point is the position of the movable body in virtual space.

In this configuration, as the movable body in virtual space moves, simulated sounds from a target object which would be observed at the position of the movable body are generated and outputted, giving consideration to propagation paths influenced by other objects or obstacles, through which sound waves from a target object are propagated.

Additionally, to achieve the above-mentioned purpose, a navigation system according to the $10^{th}$ embodiment of the present invention is a system which a position guiding system of any one of the $1^{st}$ to $8^{th}$ embodiments is loaded on a vehicle, and the observation point is the current position of the vehicle.

In this configuration, as the vehicle moves, simulated sounds from a target object which would be observed at the position of the vehicle are generated and outputted, giving consideration to propagation paths through which sound waves from a target object are propagated while being influenced by objects or obstacles.

Herein, the vehicle is an object which has wheels and moves by rolling and moving of its wheels, and is not limited to vehicles with motors such as automobiles and two-wheel vehicles; light vehicles including motorcycles under 50 cc are also included. Needless to say, they are not limited to these vehicles.

Additionally, to achieve the above-mentioned purpose, a position guiding method according to an $11^{th}$ embodiment of the present invention is a method which guides a user in reference to the positional arrangement of a target object, via sound changes as the user's observation point moves, by virtually disposing a sound source at a target object and by generating and outputting a simulation of sounds from the target object as if the sounds were emitted from the target object, which method comprises the step of (i) configuring a geographical data field in a computer system, (ii) designating a target object in the geographical data field as a sound source, (iii) designating an observation point in the geographical data field, (iv) defining the propagation of a sound from the sound source to the observation point as a sound signal which is a function of at least a distance from the sound source to the current observation point, (v) separating a sound signal arriving at the observation point into multiple audio element signals according to the direction of the sound source observed from the observation point, and (vi) reproducing and outputting to the user the multiple audio element signals whereby the user sensorially recognizes the position of the target object from the current observation point.

Herein, 'separating a sound signal arriving at the observation point into multiple audio element signals according to the direction of the sound source observed from the observation point' means that a sound signal which has arrived at the observation point and has been synthesized is separated into multiple audio element signals so that the direction of the sound source can be positioned according to the direction of the sound source observed from the observation point. Consequently, if each audio element signal is outputted from multiple sound output devices installed at positions by which a user can understand the direction of a sound, it becomes possible for the user to recognize the direction of the sound.

Furthermore, a position guiding method according to a $12^{th}$ embodiment of the present invention is a position guiding method of the $11^{th}$ embodiment, wherein a function expressing the propagation of sound waves from the sound source to the observation point uses as a parameter at least one of: a building in the geographical data field, geographical features, the moving direction of the observation point, or the moving velocity of the observation point.

Furthermore, a position guiding method according to a $13^{th}$ embodiment of the present invention is a position guiding method of any one of the $11^{th}$ or $12^{th}$ embodiments, further comprising steps wherein (i) the geographical data field is displayed to a user on a monitor, (ii) the user designates a target position on the monitor, (iii) the user's position is displayed as the observation point, and (iv) the real sounds are outputted from multiple sound output devices installed at positions by which the user can understand the direction of sounds.

Furthermore, a position guiding method according to a $14^{th}$ embodiment of the present invention is a position guiding method of the $13^{th}$ embodiment, wherein the position of a user is identified by a GPS and the geographical data field is constructed based on real map data containing the position of the user.

Furthermore, a position guiding method according to a $15^{th}$ embodiment of the present invention is a position guiding method of the $14^{th}$ embodiment, wherein the GPS, the monitor and the multiple sound output devices are loaded on a vehicle and steps to detect the direction of the vehicle from a target position and to allocate multiple audio element signals to the multiple sound output devices according to the direction of the vehicle, are further included.

In the above-mentioned embodiment, position guiding systems, a position guiding simulation system, a navigation system, and a position guiding method are proposed. Not limited to these, to achieve the above-mentioned purposes, the following storage medium can also be proposed:

This storage medium is a storage medium which stores a position guiding program to guide a user in reference to the positional arrangement of a target object, via sound changes as the user's observation point moves, by virtually disposing a sound source at the target object in a geographical data field, and by outputting a simulation of sounds from the target object as if the sounds were outputted from the sound source, which medium is a computer readable storage medium which stores a program commanding the computer to generate simulated sounds from the sound source which would be heard at the observation point and to output the generated sounds.

In this configuration, a position guiding system stored in a storage medium is read by a computer, and when the computer executes instructions according to said program, equal functions and effects to the position guiding system of at least the $1^{st}$ embodiment can be obtained.

The present invention is not limited to the foregoing embodiments and includes embodiments comprising any combination of elements used in the embodiments. In other words, the elements described above are interchangeable and can be used in any given embodiment.

Preferred modes for carrying out the present invention are described below referring to the figures. However, the present invention is not limited thereto.

FIGS. 1 to 6 show drawings of modes for carrying out position guiding systems and a navigation system and a position guiding method according to an embodiment of the present invention.

In these embodiments, a position guiding system, a navigation system, and a position guiding method according to the present invention are applied to guide a user to a plot of ground or a building in a surrounding block when a vehicle is traveling. Specifically, the present invention is applied to guide a user to an object (hereinafter, "a plot of ground" or "a building" is referred to as "an object") corresponding to the positional arrangement of a sound source via sound changes by virtually disposing a sound source corresponding to the object in the real world, and by outputting a simulation of sounds from the sound source as if the sounds were outputted from the object.

Figure 1B:
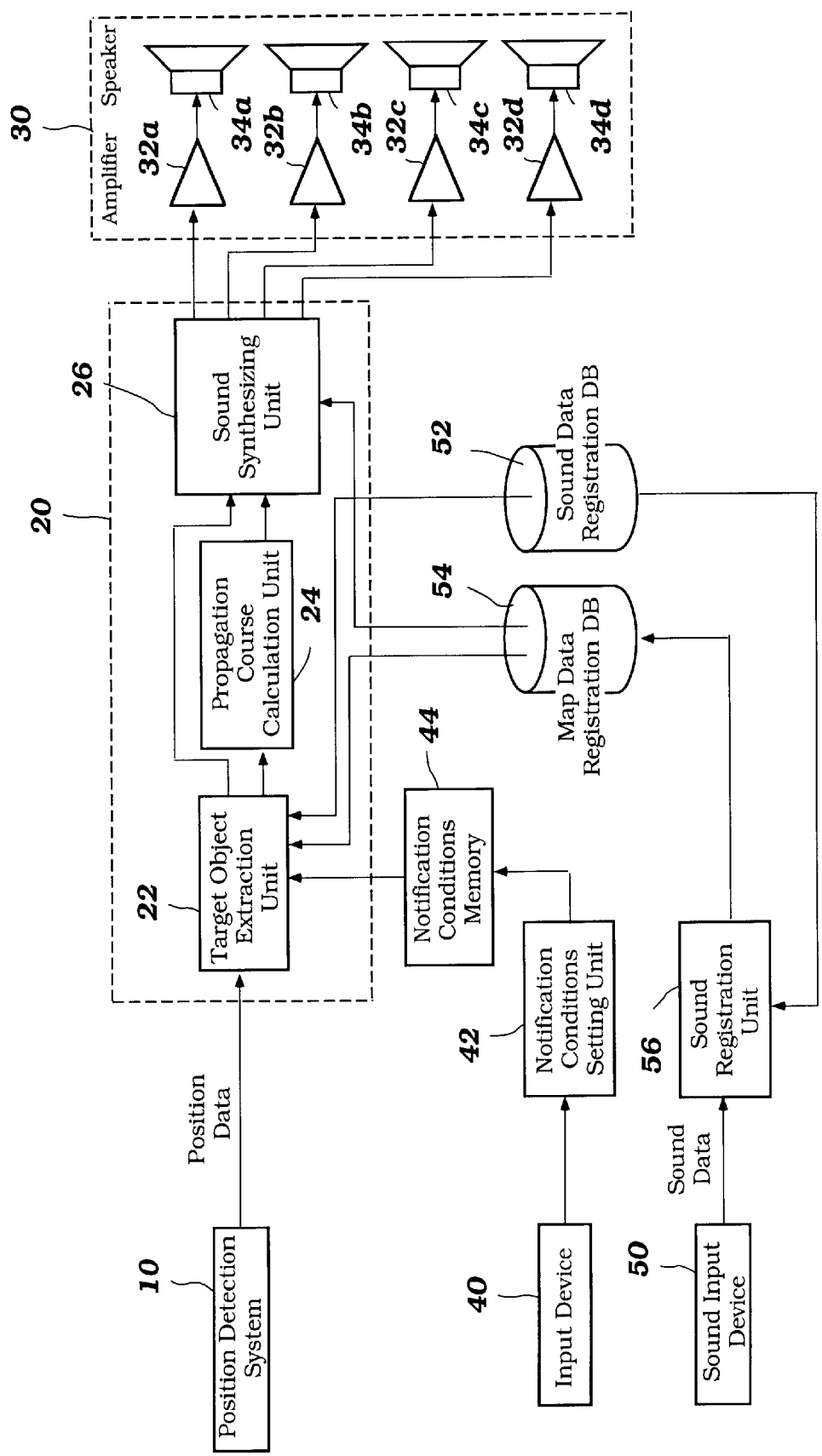
FIG. 1b shows a block diagram of a configuration of a navigation system loaded on a vehicle, to which the present invention is applied.

First of all, as one mode for carrying out the present invention, a configuration of a navigation system loaded on a vehicle is described referring to FIG. 1b. FIG. 1b is a block diagram showing the configuration of a navigation system loaded on the vehicle to which the present invention is applied.

The navigation system loaded on the vehicle, as shown in FIG. 1b, is loaded on vehicles such as automobiles, and comprises a position detection system 10, a sound generation unit 20 which generates simulated sounds from a sound source based on position data from the position detection system 10, and a sound output unit 30 which outputs sounds generated by the sound generation unit 20. Furthermore, it comprises an input device 40 as a user interface, a notification conditions setting unit 42 which sets notification conditions according to the operation of the input device 40, a notification conditions memory unit 44 which stores notification conditions set by the notification conditions setting unit 42, a sound input device 50 which inputs sound as data, a map data registration database (hereafter a database is abbreviated as "DB") 52, and a sound registration unit 56 which registers sound data from the sound input device 50 in the sound data registration DB 52 based on registered data in the map data registration DB.

The position detection system 10 receives time signals from an orbiting satellite which transmits time signals indicating the current time, detects the position of the current point based on a time lag indicated by these time signals and the revolution orbit of each orbiting satellite utilizing a so-called GPS which detects the position, and outputs the position of the current point as position data.

The sound generation unit 20 comprises a target object extraction unit 22 which extracts a target object whose position is signified by sound from the map data registration DB 52 based on position data from the position detection system 10, notification conditions stored in the notification conditions memory unit 44 and registered data stored in the sound data registration DB 54, a propagation path calculation unit 24 which calculates a propagation path influenced by other objects or obstacles, through which sound waves from the target object extracted by the target object extraction unit 22 are propagated to the vehicle, and a sound synthesizing unit 26 which synthesizes sounds expressed by sound waves which arrive at the vehicle through a propagation path calculated by the propagation path calculation unit 24.

The sound output unit 30 comprises four amplifiers 32a~32d which amplify sound signals from the sound synthesizing unit 26, and four speakers 34a~34d which correspond to each amplifier 32a~32d and convert sound signals output from these amplifiers 32a~32d to sounds and output the sounds. Each speaker 34a~34d is arranged at a different position in the vehicle. By this arrangement, a sound source can be positioned depending on how the sound is outputted.

The notification conditions setting unit 42 sets the conditions of an object for which notification by sounds as notification conditions is given according to the user's operation of the input device 50, and stores notification conditions set in the notification conditions memory unit 44. Notification conditions include object categories which a user requests (for example, convenience stores, restaurants, etc.), types of notification sounds, and notification ranges which determine a distance between the vehicle and an object when notification is given. For example, if the user sets a convenience store as an object category, an alarm sound as a type of notification sound, and 100 m as a notification range using the notification conditions setting unit 42, a simulated sound (an alarm sound) which would be observed at the current position of the vehicle is generated and outputted when a distance between a vehicle traveling on a street and a convenience store becomes less than 100 m, by disposing a sound source corresponding to the position of the convenience store as if sound were outputted from the sound source.

In the map data registration DB 52, in addition to map data relating to a map, object data relating to objects are registered. Object data comprises block data indicating a block in which an object is located when a map is divided into given blocks (for example, a rectangular block of 50 m×50m), position data indicating the coordinates for the object on the map, category data indicating object categories, and dimensions data identifying a shape of an object. Object data is registered for each of multiple objects and is managed by tables, etc. in the map data registration DB 52.

In the sound data registration DB 54, in addition to multiple sound data for reproducing sounds, pointer data for identifying sound data output from a sound source for each virtually disposed sound source corresponding to an object, block data indicating a block in which the object where the sound source is disposed is located, position data indicating the coordinates for the object on the map, and category data indicating object categories are registered. Registered data for each sound source is managed by sound-data correspondence tables, etc. in the map data registration DB 52.

Additionally, it is preferred to use sound data with details from which a form of an object can be easily recognized, for example, sound data for reproducing a commercial song of a convenience store if an object for which a sound source is disposed is a convenience store, sound data for reproducing a cheer in a baseball field if an object is a baseball field, or sound data for reproducing the sound of the waves if an object is the seaside.

In the sound registration unit 56, sound data from the sound input device 50 is registered in the sound data registration DB 54 based on object data stored in the map data registration DB 52. For example, when a new sound source is set up, while inputting a sound using the sound input device 50, a user displays a map based on map data in the map data registration DB 52 and selects an object from the map, for which he wants to dispose a sound source. When sound data is inputted from the sound input device 50 and an object is selected, the sound registration unit 56 reads object data of the selected object from the map data registration DB 52 and registers the read object data in a sound-data correspondence table and the inputted sound data in the sound data registration DB 54 respectively.

Figure 2:
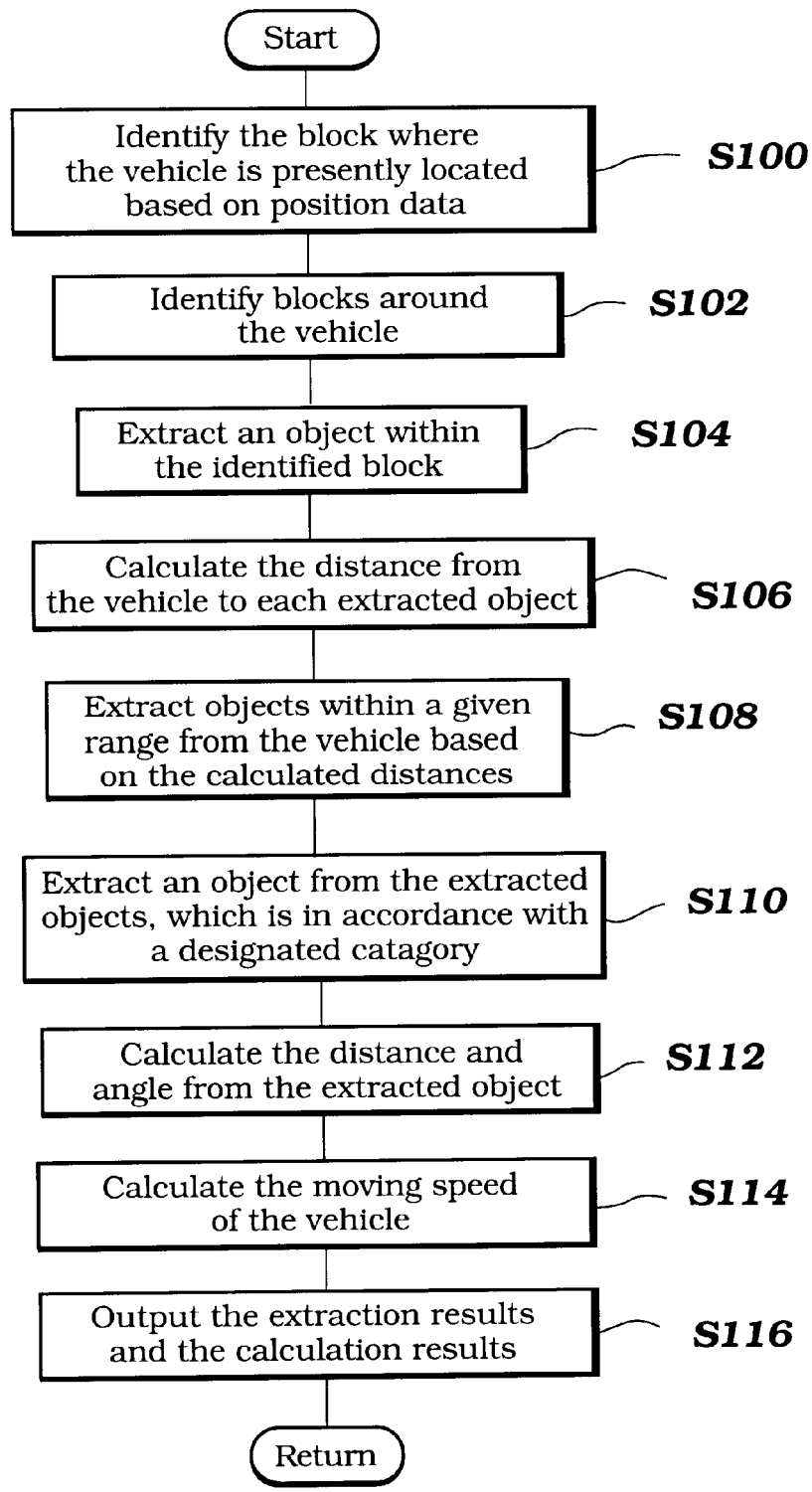
FIG. 2 shows a flowchart of target object extraction processing executed at a target object extraction unit 22.
Figure 3:
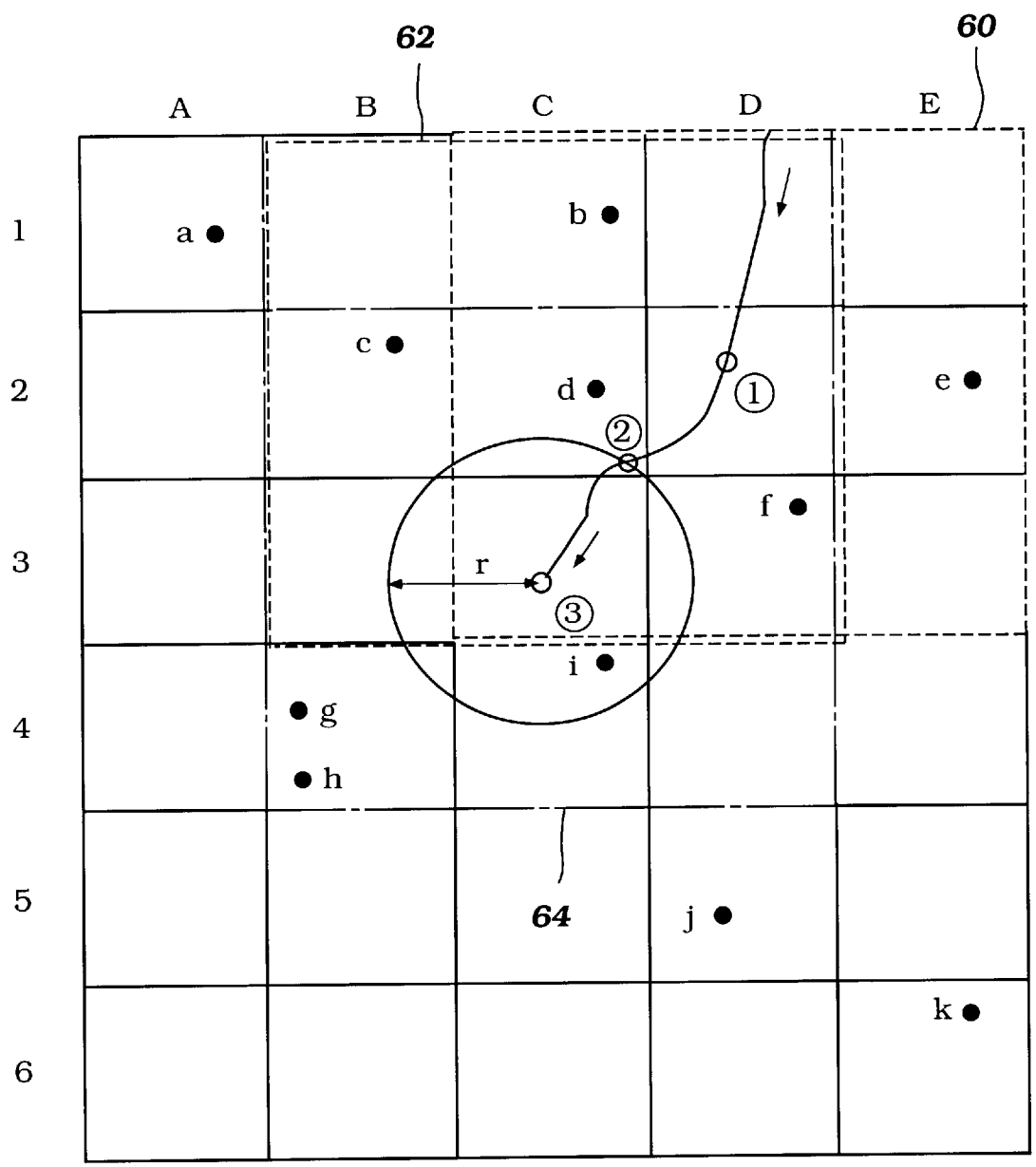
FIG. 3 shows a drawing of map divisions.

Next, the configuration of the target object extraction unit 22 is described referring to FIG. 3. The target object extraction unit 22 is designed to repeatedly execute target object extraction processing shown in a flowchart in FIG. 2 by interruption handling for every given cycle upon restarting the system. FIG. 2 is a flowchart indicating target object extraction processing to be executed by the target object extraction unit 22.

The target object extraction processing is the processing to extract a target object within a given range from the current position of a vehicle based on notification conditions stored in the notification conditions memory unit 44 and registered data stored in the sound data registration DB 54. When the processing is executed at the target object extraction unit 22, first, it shifts to Step S100 as shown in FIG. 2.

At Step S100, a unit area or a block in which the vehicle is located is identified based on position data from the position detection system 10 and registered data in the map data registration DB 52. The map is divided, for example, in such way as shown in FIG. 3. FIG. 3 shows a drawing of map division.

The map, as shown in FIG. 3, is divided using a block in a rectangular shape as a unit. The map shown in FIG. 3 is divided into 5 blocks horizontally and 6 blocks longitudinally, and it comprises 30 blocks in total. Additionally, multiple objects are disposed on the map and for each object, a sound source is disposed corresponding to each.

In an example shown in FIG. 3, when letters A to E are assigned to the horizontal blocks from left to right as horizontal marks and numbers 1 to 6 are assigned to longitudinal blocks from top to bottom as longitudinal marks and if each block is identified by a combination of a horizontal mark and a longitudinal mark, Object "a" is disposed in Block A1, Object "b" is disposed in Block C1 and Object "c" is disposed in Block B2. Additionally, Objects "d", "e", "f", "i", "j" and "k" are disposed in Block C2, E2, D3, C4, D5 and E6, respectively, and Object "g" and "h" are disposed in Block B4.

A block in which the vehicle is located is identified by searching a satisfying block from coordinates on the map which are identified by position data from the position detection system 10. In FIG. 3, a white circle indicates the position of the vehicle. At a point in time marked by No.1, Block D2 is identified as a block in which the vehicle is located, and at a point in time marked by No.2 or No.3, Block C2 or Block C3 is identified as a block in which the vehicle is located, respectively.

Next, shifting to Step S102, blocks surrounding the vehicle are identified based on registered data in map data registration DB 52. For example, eight blocks adjacent to the block in which the vehicle is currently located are identified as surrounding blocks. In the example shown in FIG. 3, at a point in time marked by No.1, Blocks C1~E1, C2, E2 and C3~E3, which are enclosed with a border line 60 are identified as surrounding blocks. Additionally, at a point in time marked by No.2, Blocks B1~D1, B2, D2 and B3~D3, which are enclosed with a border line 62 are identified as surrounding blocks, and at a point in time marked by No.3, Blocks B2~D2, B3, D3 and B4~D4, which are enclosed with a border line 64 are identified as surrounding blocks.

Next, shifting to Step S104, the block data of blocks is read from a sound-data correspondence table, and based on the block data read, objects within the blocks identified in Steps S100 and S102 are extracted. In the example shown in FIG. 3, at a point in time marked by No.1, objects "b", "d", "e" and "f" are extracted. Additionally, at a point in time marked by No.2, objects "b", "c", "d" and "f" are extracted and at a point in time marked by No.3, objects "c", "d", "f", "g", "h" and "i" are extracted.

Next, shifting to Step S106, the position data of blocks is read from a sound-data correspondence table, based on the position data read and the position data from the position detection system 10, a distance between each object extracted in Step S104 and the current position of the vehicle is calculated. When coordinates are rectangular coordinates, a distance is calculated by squaring the remainder between x coordinates of an object and x coordinates of the current position of the vehicle and squaring the remainder between y coordinates of the object and y coordinates of the current position of the vehicle, then adding two squares and obtaining the square root of the sum.

Next, shifting to Step S108, objects within a given range from the vehicle (for example, 80 meters) are extracted. In the example shown in FIG. 3, at a point in time marked by No.3, inside a region indicated by a circle with the radius of r from the vehicle as a center is within a given range. Since Object "i" is located in this given range, Object "i" is extracted as a target object.

Next, shifting to Step S110, the category data of objects is read from a sound-data correspondence table and notification conditions are read from the notification conditions memory unit 42, and based on the category data read, from the objects extracted in Step S108, objects agreeing with the category of notification conditions are extracted. For example, if a convenience store is set as a category for objects which a user wants to be notified of, a convenience store is extracted from the objects extracted in Step S108.

Next, shifting to Step S112, a distance between the target object extracted in Step S110 and the current position of the vehicle and an angle which the line connecting the target object and the vehicle from a given direction of the map (for example, north) is calculated. Shifting to Step S114, for example, by differentiating the position data from the position detection system 10 with respect to time, a moving velocity of the vehicle is calculated, then the processing shifts to Step S116.

In Step S116, dimensions data of objects is read from the map data registration DB 52, and while dimensions data are being read, the position data of objects, and the distance, the angle and the moving velocity which are calculated in Step 112 and Step 114 are outputted to the propagation path calculation unit 24 and the sound synthesizing unit 26 for each target object. The current position of the vehicle is outputted to the propagation path calculation unit 24 and the sound synthesizing unit 26. Upon completing a series of processes, the processing returns to the original process.

Figure 4:
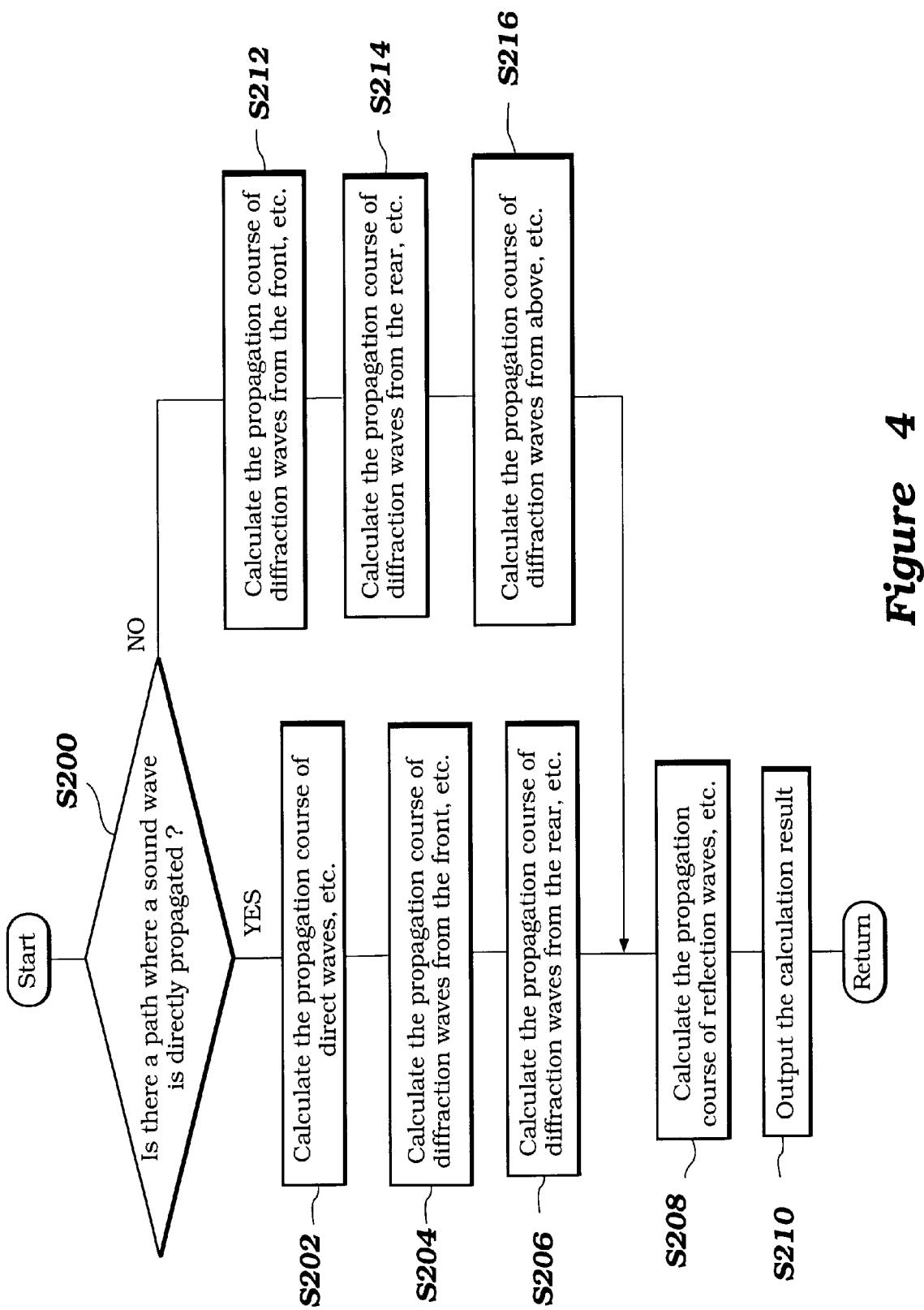
FIG. 4 shows a flowchart of propagation path calculation processing executed at a propagation path calculation unit 24.
Figure 5:
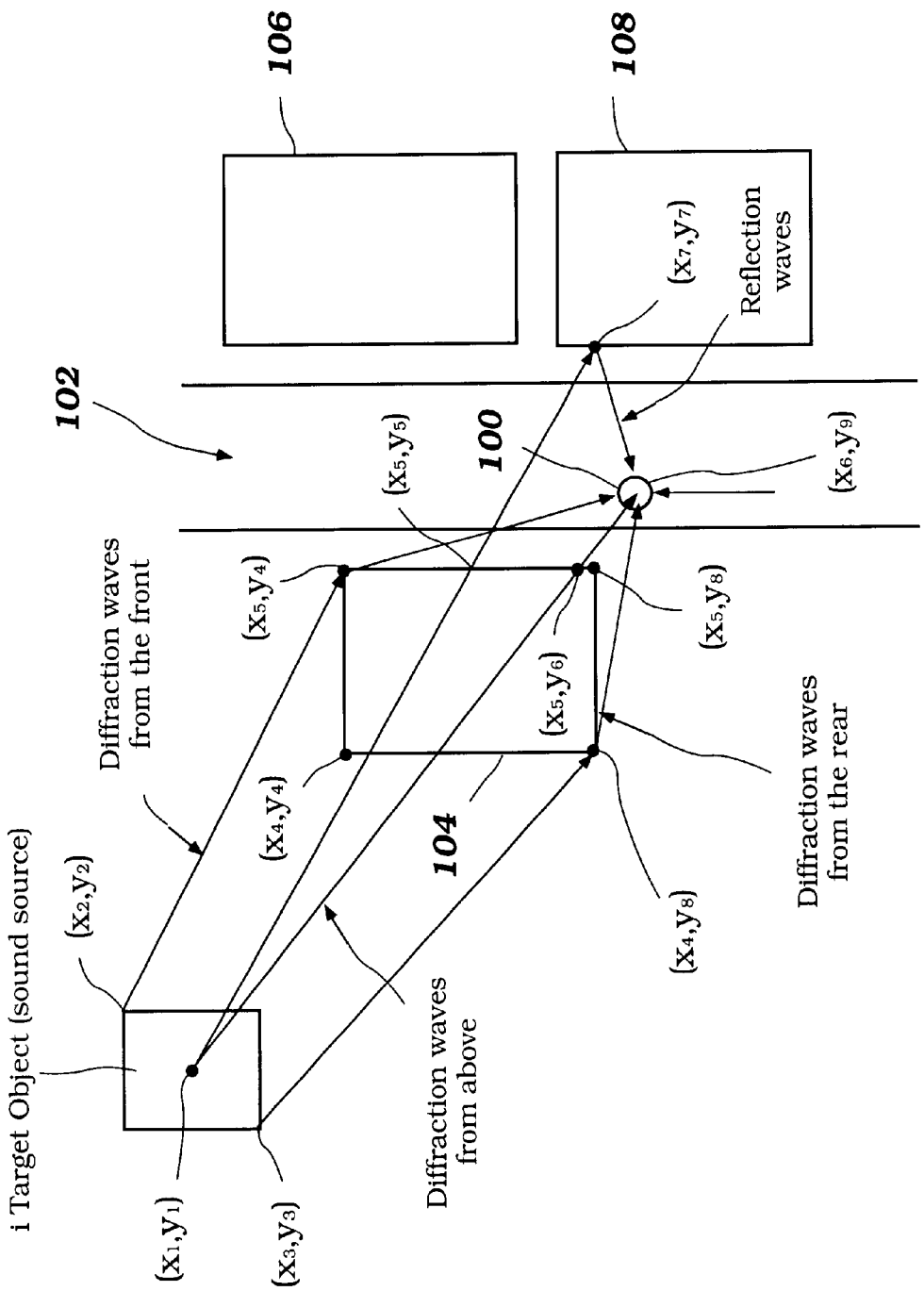
FIG. 5 shows a drawing of a propagation path through which sound waves from a sound source disposed corresponding to the position of a target object "i" are propagated to a vehicle 100.

Next, the configuration of the propagation path calculation unit 24 is described referring to FIG. 4 and FIG. 5.

The propagation path calculation unit 24 is designed to repeatedly execute propagation path calculation processing shown in a flowchart in FIG. 4 by interruption handling for a given cycle upon restarting the system. FIG. 4 shows a flowchart indicating propagation path calculation processing executed by the propagation path calculation unit 24.

The propagation path calculation processing is processing to calculate a propagation path influenced by other objects or obstacles, through which sound waves from a sound source disposed corresponding to the position of a target object based on data from the target object extraction unit 22 are propagated. When the processing is executed at the propagation path calculation unit 24, the processing first activates Step S200 as shown in FIG. 4.

The processing of each step is described below additionally referring to FIG. 5. FIG. 5 is a drawing of a propagation path through which sound waves from a sound source disposed corresponding to the position of a target object "i" are propagated to a vehicle 100.

In FIG. 5, on both sides of a roadway 102 which the vehicle 100 travels, objects 1, 04, 106 and 108 are disposed. The object 104 is disposed on the left side of the roadway 102 from the traveling direction of the vehicle 100. The object 108 is on the right side of the roadway 102 from the traveling direction of the vehicle 100 and is disposed on the left side of the object 106 along the roadway 102. The target object "i" is disposed on the left side of the object 104 from the traveling direction of the vehicle 100. The vehicle 100 is positioned on a line extended from the target object "I" and the object 104.

Herein, let the coordinates of the center, right top and left top of the target object "I" be $(x_1, y_1)$, $(x_2, y_2)$, $(x_3, y_3)$ respectively and let the coordinates of the right top, right bottom, left bottom and left top of the object 104 be $(x_5, y_4)$, $(x_5, y_8)$, $(x_4, y_8)$, and $(x_4, y_4)$ respectively. Additionally, of the propagation path through which sound waves from the center of the target object "i" are propagated to the vehicle 100 after being diffracted above the object 104, let the coordinates of a diffraction point at the object 104 be $(x_5, y_6)$, and of the propagation path through which sound waves from the center of the target object are propagated to the vehicle 100 after being reflected by the object 108 above the object 104, let the coordinates of a diffraction point at the object 104 and of a reflection point at the object 108 be $(x_6, y_5)$ and $(x_7, y_7)$ respectively. Furthermore, let the coordinates of the current position of the vehicle 100 be $(x_6, y_4)$. These coordinates are identified based on dimensions data inputted from the target object extraction unit 22 and the current position of the vehicle 100.

In Step S200, it is determined whether or not there is a propagation path through which sound waves from a sound source disposed corresponding to the position of a target object are directly propagated to the vehicle 100. When it is decided that there is a propagation path through which the sound waves are directly propagated (Yes), the processing shifts to Step S202 and the propagation paths of directly transmitted waves from a sound source and arrival time with which sound waves from a sound source arrive at the vehicle 100 through the propagation path are calculated. The propagation path of directly transmitted waves is calculated by calculating a one-line distance between the coordinates of a target object and the coordinates of the vehicle 100 and by calculating the real moving velocity of the vehicle 100. The real moving velocity of directly transmitted waves is calculated by multiplying a cosine of an angle made by an incidence of the propagation path incident on the vehicle 100 and the traveling direction of the vehicle 100 by the moving velocity of the vehicle 100. The arrival time of directly transmitted waves is calculated by dividing a distance of the propagation path by the speed of sound.

Next, shifting to Step S204, the propagation paths and arrival time of diffraction waves from the front of the traveling direction of the vehicle 100 are calculated. Shifting to Step S206, the propagation path and arrival time of diffraction waves from the rear of the traveling direction of the vehicle 100 are calculated, then the process shifts to Step S208.

In Step S208, the propagation paths and arrival time of reflection waves are calculated. In an example shown in FIG. 5, of the propagation path of reflection waves, a distance of the propagation path is calculated by adding a distance from $(x_1, y_1)$ to $(x_5, y_5)$, a distance from $(x_5, y_6)$ to $(x_6, y_7)$, and a distance from $(x_6, y_7)$ to $(x_6, y_9)$. Additionally, of the propagation path of reflection waves, a real moving velocity is calculated by multiplying a cosine of an angle made by the line connecting $(x_6, y_7)$ and $(x_6, y_9)$ and the traveling direction of the vehicle 100 by the moving velocity of the vehicle 100. Additionally, the arrival time of reflection waves is calculated by dividing a distance of the propagation path by the speed of sound.

Next, shifting to Step S208, calculation results in each step are outputted to the sound synthesizing unit 26. Upon completing a series of processes, the processing returns to the original process.

Additionally, in Step S200, if it is decided that there is no propagation path through which sound waves from a sound source disposed corresponding to the position of a target object are directly propagated to the vehicle 100 (No), shifting to Step S212, the propagation paths and arrival time of diffraction waves from the front of the traveling direction of the vehicle 100 are calculated. In the example in FIG. 5, of the propagation path of diffraction waves, a distance of the propagation path is calculated by adding a distance from $(x_2, y_2)$ to $(x_5, y_4)$ and a distance from $(x_5, y_4)$ to $(x_5, y_9)$. Additionally, of the propagation path of diffraction waves, a real moving velocity is calculated by multiplying a cosine of an angle made by the line connecting $(x_5, y_4)$ and $(x_6, y_9)$ and the traveling direction of the vehicle 100 by the moving velocity of the vehicle 100. Additionally, the arrival time of diffraction waves is calculated by dividing a distance of the propagation path by the speed of sound.

Next, shifting to Step S214, the propagation paths and arrival time of diffraction waves from the rear of the traveling direction of the vehicle 100 are calculated. In the example shown in FIG. 5, of the propagation path of diffraction waves, a distance of the propagation path is calculated by adding a distance from $(x_3, y_3)$ to $(x_4, y_8)$ and a distance from $(x_4, y_8)$ to $(x_6, y_9)$. Additionally, of the propagation path of diffraction waves, a real moving velocity is calculated by multiplying a cosine of an angle made by the line connecting $(x_4, y_8)$ and $(x_6, y_9)$ and the traveling direction of the vehicle 100 by the moving velocity of the vehicle 100. Additionally, the arrival time of diffraction waves is calculated by dividing a distance of the propagation path by the speed of sound.

Next, shifting to Step S216, the propagation paths and arrival time of diffraction waves from above the vehicle 100 are calculated, then the process shifts to Step S208. In the example shown in FIG. 5, of the propagation path of diffraction waves, a distance of the propagation path is calculated by adding a distance from $(x_1, y_1)$ to $(x_5, y_6)$ and a distance from $(x_5, y_6)$ to $(x_6, y_9)$. Additionally, of the propagation path of diffraction waves, a real moving velocity is calculated by multiplying a cosine of an angle made by the line connecting $(x_5, y_6)$ and $(x_6, y_9)$ and the traveling direction of the vehicle 100 by the moving velocity of the vehicle 100. Additionally, the arrival time of diffraction waves is calculated by dividing a distance of the propagation path by the speed of sound.

Consequently, if there is a propagation path through which sound waves from a sound source are directly propagated to the vehicle 100, the propagation path and arrival time of directly transmitted waves, diffraction waves from the front, diffraction waves from the rear and reflection waves are calculated. If there is no such propagation path, diffraction waves from the front, diffraction waves from the rear, diffraction waves from above and reflection waves are calculated. Furthermore, diffraction waves and reflection waves are calculated with an object adjacent to the roadway 102 as a target. The reason for this is that, even if an influence from an object which cannot be observed from the vehicle 100 is considered, it is difficult for a user to recognize the object visually. Consequently, by considering only an influence of an object which can be observed from the vehicle 100, it helps the user to recognize the direction of a sound source and a distance. Additionally, calculations are simplified.

Figure 6:
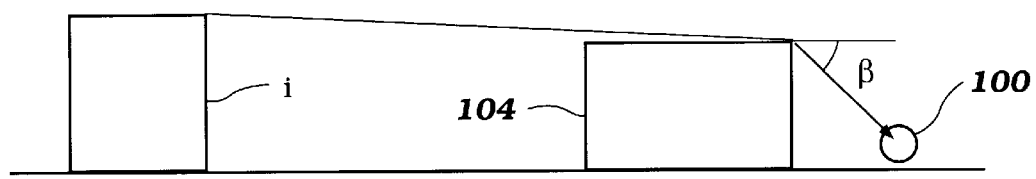
FIG. 6 shows a drawing of a propagation path of diffraction waves from above the vehicle 100.

Next, the configuration of the sound synthesizing unit 26 is described in detail referring to FIG. 6. FIG. 6 is a drawing of a propagation path of diffraction waves from above the vehicle 100.

The sound synthesizing unit 26 is designed to read the sound data of a target object referring to a sound-data correspondence table, and based on sound data read and the propagation paths and arrival time of directly transmitted waves, diffraction waves from the front, diffraction waves from the rear, diffraction waves from above and reflection waves, synthesize sounds expressed by combining directly transmitted waves, diffraction waves from the front, diffraction waves from the rear, diffraction waves from above and reflection waves. Specifically, sounds from each propagation path are synthesized respectively after shifting their phase according to the transmission time, attenuating them based on diffraction coefficients and reflection coefficients, and further adding the Doppler effect corresponding to the moving velocity of the vehicle 100 based on a real moving velocity of the propagation path.

Additionally, for example, as shown in FIG. 6, the larger the angle $\beta$ made between diffraction waves and the horizontal direction is when sound waves from a target object "i" is diffracted at the object 104, the higher frequency of the sound waves arriving through the propagation path is. This is because sound waves have a property that the higher their frequency, the harder they are to be diffracted.

Next, operation of the above-mentioned embodiment is described.

When the power for the navigation system loaded on the vehicle is turned on, the target object extraction unit 22 and the propagation path calculation unit 24 are activated, and target object extraction processing at the target object extraction unit 22 and propagation path calculation processing at the propagation path calculation unit 24 are repeatedly executed for each given cycle. Needless to say, other processing units are also activated upon turning the power on.

When the vehicle 100 travels on the roadway 102 and as it travels, the current position of the vehicle 100 is detected by the position detection system 10 and the detected current position is outputted as position data to the target object extraction unit 22.

At the target object extraction unit 22, when position data is inputted, by going through Steps S100 to S104, a block in which the vehicle 100 is located and blocks surrounding the vehicle 100 are identified based on inputted position data and registered data in the map data registration DB 52, and objects within the identified block are extracted based on block data in a sound-data correspondence table.

Next, going through Steps S106 to S110, a distance between each object extracted and the current position of the vehicle 100 is calculated based on position data in the sound-data correspondence table and inputted position data. Based on the calculated distance, objects within a given range from the vehicle 100 are extracted. Next, notification conditions are read from the notification conditions memory unit 42, and based on category data in a sound-data correspondence table, an object which agrees with the category of notification conditions is extracted from the objects extracted.

Next, going through Steps S112 to S116, a distance between an extracted target object and the current position of the vehicle 100 and an angle made by the line connecting the target object and the vehicle 100 from a given direction on the map are calculated, a moving velocity of the vehicle 100 is calculated, and these calculation results are outputted to the propagation path calculation unit 24 and the sound synthesizing unit 26.

Next, described is a case where there is a propagation path through which sound waves from a sound source disposed corresponding to the position of a target object are directly propagated to the vehicle 100.

At the propagation path calculation unit 24, when the calculation results from the target object extraction unit 22 are inputted, going through Steps S200 to S210, the propagation paths and arrival time of directly transmitted waves, diffraction waves from the front, diffraction waves from the rear and reflection waves are calculated, and these calculation results are outputted to the sound synthesizing unit 26.

At the sound synthesizing unit 26, when the calculation results from the propagation path calculation unit 24 are inputted, sound data of the target object is read, sounds expressed by combining directly transmitted waves, diffraction waves from the front, diffraction waves from the rear and reflection waves are synthesized based on the propagation paths and the arrival time of directly transmitted waves, diffraction waves from the front, diffraction waves from the rear and reflection waves, which have been calculated by the propagation path calculation unit 24, and sound data read, and synthesized sounds are outputted from speakers 34a to 34d in such a way that a sound source can be positioned.

Next, described is a case where there is no propagation path through which sound waves from a sound source disposed corresponding to the position of the target object are directly propagated to the vehicle 100.

At the propagation path calculation unit 24, when the calculation results from the target object extraction unit 22 are inputted, going through Steps S200, and S212 to S216, the propagation paths and the arrival time of diffraction waves from the front, diffraction waves from the rear, diffraction waves from above and reflection waves are calculated, and these calculation results are outputted to the sound synthesizing unit 26.

At the sound synthesizing unit 26, when the calculation results are inputted from the propagation path calculation unit 24, sound data for the target object are read. Sounds expressed by combining diffraction waves from the front, diffraction waves from the rear, diffraction waves from above, and reflection waves are then synthesized based on the propagation paths and the arrival time of diffraction waves from the front, diffraction waves from the rear, diffraction waves from above, and reflection waves. These data have been calculated by the propagation path calculation unit 24. Synthesized sounds are then outputted from speakers 34a to 34d in such a way that the location of the sound source can be identified.

Consequently, a user who is a passenger of the vehicle 100 is not only able to sensorially understand a distance to a target object but also able to sensorially understand the geographical conditions of blocks surrounding the target object. For example, the closer the vehicle approaches the target object, the higher the sound volume becomes. Conversely, the farther the vehicle goes away from a destination object, the lower the sound volume becomes. If there is another object between a target object and the vehicle 100, even when the vehicle is approaching the target object, the sound volume becomes low until the vehicle passes the obstacle. After passing the obstacle, the sound volume increases again. The movement of the vehicle 100, therefore, enables the user to recognize, by sound changes, whether a target object is behind another object, or there is no other object in front of the target object.

Thus, this embodiment is designed so that (i) a sound source corresponding to the position of a target object is virtually disposed, (ii) a propagation path influenced by other objects or obstacles, through which sound waves from the sound source are propagated, is identified based on position data from the position detection system 10, (iii) simulated sounds expressed by combining directly transmitted waves, diffraction waves, and reflection waves, which arrive at the vehicle 100 through propagation paths, are generated, and (iv) generated sounds are outputted from multiple speakers 34a to 34d in such a way that the target object can sensorially be recognized.

Thus, because synthesized signals of directly transmitted waves, diffraction waves and reflection waves are considered when outputting a sound, the positional relation between a target object and the vehicle 100 can be sensorially understood together with the geographical conditions of blocks surrounding the target object. Consequently, as compared with conventional systems, the positional relation between a target object and the vehicle 100 can be sensorially understood in environments crowded with objects.

Furthermore, this embodiment is designed so that the Doppler effect according to a moving velocity of the vehicle 100 is added to sounds expressed by combining directly transmitted waves, diffraction waves and reflection waves based on a moving velocity detected by the target object extraction unit 22.

Thus, when the vehicle 100 moves, the positional relation between a target object and the vehicle 100 can be more sensorially understood together with the geographical conditions of blocks surrounding the target object. Consequently, the positional relation between a target object and the vehicle 100 can be more sensorially understood in environments crowded with many objects.

Furthermore, this embodiment is designed so that the category data of objects is read from a sound-data correspondence table, notification conditions are read from the notification conditions memory unit 42, and objects agreeing with the category of notification conditions are extracted from the objects extracted in Step S108 based on the category data read.

Thus, since sounds are outputted for an object for which a user desires to receive notification, guidance relatively according to the user's desire can be realized.

In the above-mentioned embodiment, position data corresponds to position information of the $3^{rd}$ embodiment, an object corresponds to an object of the $1^{st}$ to $4^{th}$ embodiments, diffraction waves and reflection waves correspond to indirectly transmitted waves of the $2^{nd}$, $3^{rd}$, $4^{th}$, $6^{th}$ or $7^{th}$ embodiments, and the current position of the vehicle 100 corresponds to an observation point of the $1^{st}$ to $4^{th}$, $7^{th}$, $10^{th}$, $11^{th}$, $12^{th}$ or $13^{th}$ embodiments. Additionally, the position detection system 10 corresponds to a positional information detector of the $3^{rd}$ embodiment, the sound generation unit 20 corresponds to a sound generator of the $3^{rd}$, $6^{th}$ or $7^{th}$ embodiments, the sound output unit 30 corresponds to a sound output device of the $3^{rd}$, $13^{th}$ or $15^{th}$ embodiments, and the position detection system 10 and the target object extraction unit 22 correspond to a velocity detector of the $7^{th}$ embodiment.

Furthermore, the above-mentioned embodiment is configured so that the Doppler effect according to a moving velocity of the vehicle 100 is added to sounds expressed by combining directly transmitted waves, diffraction waves and reflection waves. Not limited to this configuration, it can be configured so that the Doppler effect according to a velocity unrelated to a moving velocity of the vehicle 100 is added to the sounds. For example, it can be configured so that the Doppler effect according to a velocity unrelated to a moving velocity of the vehicle 100 is added to sounds expressed by combining directly transmitted waves, diffraction waves and reflection waves when a distance between a target object and the current position of the vehicle 100 becomes less than a given range (for example, 10 meters).

Thus, when a distance between a target object and the vehicle 100 becomes less than a given range, the Doppler effect is added to an output sound more emphatically than a sound felt at an actual moving velocity, the user can direct his attention to the fact that the target object is near.

Additionally, the above-mentioned embodiment is configured in such a way that four propagation paths are identified and sounds expressed by combining directly transmitted waves, diffraction waves or reflection waves which arrive at the vehicle 100 through each propagation path are generated. Not limited to this configuration, it can be configured in such a way that more propagation paths are identified, and sounds expressed by combining directly transmitted waves, diffraction waves, or reflection waves, which arrive at the vehicle 100 through each propagation path, are synthesized. Thus, the positional relation between a target object and the vehicle 100 can be more clearly sensorially understood in environments crowded with many objects.

Furthermore, in the above-mentioned embodiment, when sound waves from a sound source are propagated to the vehicle 100 while being influenced by other objects, both diffraction waves and reflection waves are considered. Not limited to these, however, it is acceptable to consider interference waves generated by using one of directly transmitted waves, diffraction waves, or reflection waves.

Furthermore, in the above-mentioned embodiment, for sound waves from a sound source which are propagated to the vehicle 100 while being influenced by other object, diffraction waves and reflection waves are considered. Not limited to this configuration, however, without considering reflection waves, it is acceptable to consider only diffraction waves. Even with such a configuration, at least in terms of the direction of a target object observed from the vehicle 100, the positional relation between a target object and the vehicle 100 can be sensorially understood together with the geographical conditions of blocks surrounding the target object.

Figure 7:
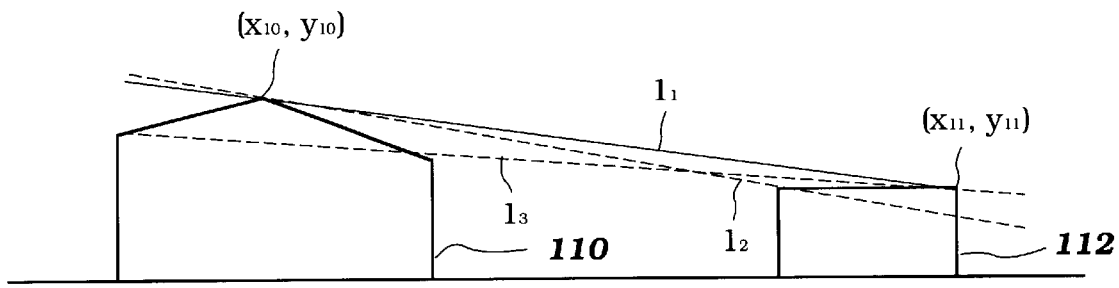
FIG. 7 shows a drawing to describe a calculation process of diffraction waves when an object is a polygon.

Additionally, in the above-mentioned embodiment, a calculation procedure of the propagation path of diffraction waves is performed only two-dimensionally. Specifically, the propagation path can be identified by geometrically calculating a tangent connecting a target object and other objects and a tangent connecting the current position of the vehicle 100 and other objects from the coordinates of each target object, the coordinates of other objects and the current position of the vehicle 100. If an object is a polygon, as shown in FIG. 7, of straight lines connecting each end point of the target object and each end point of other object respectively, a straight line with which all the coordinates of other straight lines are on one side of a point of contact with the end point of the object, is determined as a tangent. FIG. 7 shows a calculation process of diffraction waves if an object is a polygon.

In an example shown in FIG. 7, as a straight line connecting each end point of an object 110 and each end point of an object 112, lines $l_1$, $l_2$ and $l_3$ can be drawn. As for the line $l_1$, because the coordinates of other straight lines $l_2$ and $l_3$ are all on the lower side at a point of contact $(x_{10}, y_{10})$ with the end point of the object 110, and the coordinates of other straight lines $l_1$ and $l_3$ are all on the lower side at a point of contact $(x_{11}, y_{11})$ with the end point of the object 112, the line $l_1$ is determined as a tangent connecting the object 110 and the object 112.

Additionally, in the above-mentioned embodiment, when executing the processes shown in flowcharts in FIG. 2 and FIG. 4, in either case, cases where the processes are executed at the target object extraction unit 22 and the propagation path calculation unit 24 are described. Not limited to this configuration, however, it is acceptable to use configurations in which the target object extraction unit 22 and the propagation path calculation unit 24 are connected to a CPU, ROM and RAM by bus connection, and the procedures can be executed by reading a program directing the procedures from a storage medium storing the program to a RAM.

Herein, storage media are semiconductor storage media such as RAM, ROM, etc., magnetic memory type storage media such as FD, HD, etc., optical reader storage media such as CD, CDV, LD, DVD, etc. and magnetic storage/optical reader storage media such as MO, etc., and regardless of reading methods such as electronic, magnetic, optical, etc., these include any storage media provided they are computer readable.

Figure 8:
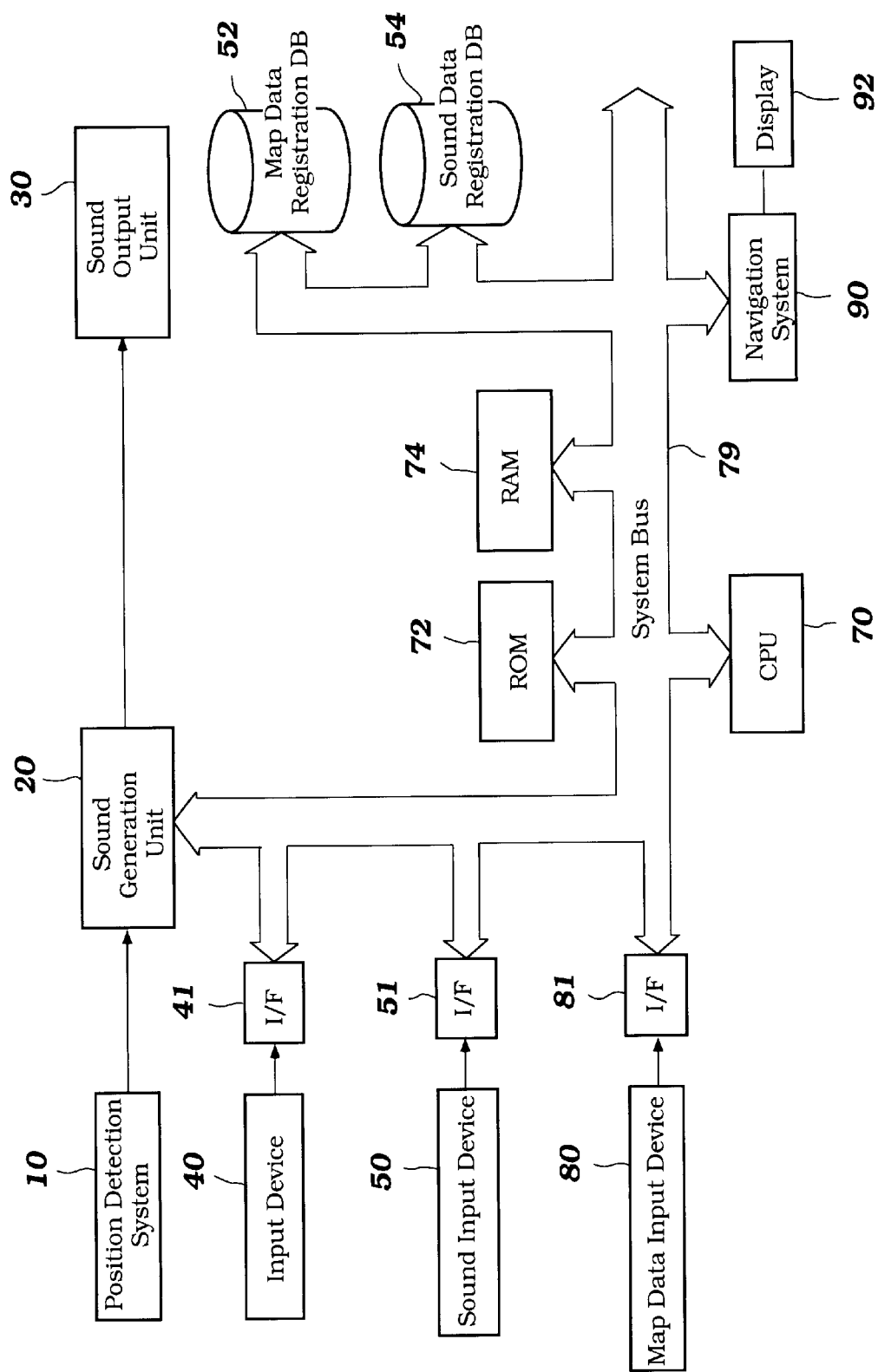
FIG. 8 shows a block diagram of a specific configuration of a navigation system loaded on a vehicle, to which the present invention is applied.

Additionally, in the above-mentioned embodiment, for a navigation system loaded on the vehicle, a configuration shown in FIG. 1b is used. More specifically, a configuration shown in FIG. 8 can be used. FIG. 8 is a block diagram indicating a specific configuration of a navigation system loaded on the vehicle, to which the present invention is applied.

A navigation system loaded on the vehicle is configured, as shown in FIG. 8, in addition to the configuration shown in FIG. 1b, with CPU 70 which controls calculations and the entire system based on control programs, ROM 72 which stores CPU 70 control programs, etc. in fixed regions beforehand, RAM 74 which stores data read from ROM 72, etc. and calculation results necessary for calculation processes of the CPU 70, and I/F 41, 51 and 81 which interface data input/output for external devices. These components are connected to each other to send/receive data and by a system bus 79 which is a signal cable to transfer data.

Furthermore, a sound generator 20, a navigation system 90 which realizes navigation using a display 92, a map data registration DB 52 and a sound data registration DB 54 are connected to the system bus 79. Additionally, a notification conditions setting unit 42, a notification condition memory unit 44 and a sound registration unit 56 in FIG. 1*b* are realized by the processes executed by CPU 70 and RAM 74.

An input device 40 is connected to I/F 41, a sound input device 50 is connected to I/F 51 and a map data input device 80 which inputs a map as data is connected to I/F 81 respectively.

CPU 70, for example under instruction from a user, inputs map data from the map data input device 80 via I/F 81, and registers map data inputted in the map data registration DB 52. Additionally, using the navigation system 90, it realizes functions to guide a user to a route to a target position set by the user on the map by sounds, messages, etc.

Additionally, in the above-mentioned embodiment, a position guiding system and a navigation system and a position guiding method according to the present invention are applied to guide a traveling vehicle to a plot of ground or a building surrounding the vehicle via sound changes. Not limited to this application, however, they can be applied to any other embodiments within the scope not deviating from the object of the present invention.

Alternatively, in the above-mentioned embodiment, a position guiding system and a navigation system and a position guiding method according to the present invention are applied to a navigation system loaded on the vehicle. Not limited to this application, however, a position guiding system and a navigation system and a position guiding method according to the present invention can be applied to position guiding simulations to guide a user to the position of a destination object disposed in virtual space using the movement of a movable body in virtual space.

EFFECTS OF INVENTION

As described in the above, according to a position guiding system of the $1^{st}$ or $2^{nd}$ embodiments according to the present invention, as compared with conventional systems, effects which the positional relation between the positional arrangement of a sound source and the an observation point can be sensorially understood in an environment crowded with objects can be obtained.

Furthermore, according to a position guiding system of the $3^{rd}$ to $8^{th}$ embodiments according to the present invention, as compared with conventional systems, effects can be exhibited wherein the positional relation between the position in the real world corresponding to the positional arrangement of a sound source and an observation point can be sensorially understood in an environment crowded with many objects.

Furthermore, according to a position guiding system of the $4^{th}$ embodiment according to the present invention, effects can also be exhibited wherein the positional relation between the position in the real world corresponding to the positional arrangement of a sound source and the an observation point can be more clearly sensorially understood in an environment crowded with objects.

Furthermore, according to a position guiding system of the $5^{th}$ embodiment according to the present invention, effects can also be exhibited wherein the positional relation between the position of a destination object in the real world and an observation point can be sensorially understood in an environment crowded with many objects.

Furthermore, according to a position guiding system of the $6^{th}$ or $7^{th}$ embodiments according to the present invention, effects can also be exhibited wherein the positional relation between the position in the real world corresponding to the positional arrangement of a sound source and an observation point can be more clearly sensorially understood in an environment crowded with many objects.

Furthermore, according to a position guiding system of the $8^{th}$ embodiment according to the present invention, when a distance between an observation point and a sound source becomes less than a given range, the Doppler effect is added to an output sound more emphatically than a sound felt at an actual moving velocity, the user can direct his attention to the fact that the position in the real world corresponding to the positional arrangement of the sound source is near.

Additionally, according to a position guiding simulation system of the $9^{th}$ embodiment according to the present invention, as compared with conventional systems, effects can be exhibited wherein the positional relation between the positional arrangement of a sound source and the position of a movable body can be sensorially understood in an environment crowded with many objects.

Additionally, according to a navigation system of the $10^{th}$ embodiment according to the present invention, as compared with conventional systems, effects can be exhibited wherein the positional relation between the position in the real world corresponding to the positional arrangement of a sound source and the current position of a vehicle can be sensorially understood in an environment crowded with many objects.

Additionally, according to a position guiding method of the $11^{th}$ to $15^{th}$ embodiments according to the present invention, effects can be exhibited wherein reproduced real sounds enable a user to understand the relative position of an observation point and a target position that is a sound source.

It will be understood by those of skill in the art that numerous and various modifications can be made without departing from the spirit of the present invention. Therefore, it should be clearly understood that the forms of the present invention are illustrative only and are not intended to limit the scope of the present invention.

What is claimed is:

1. A position guiding method for guiding a user in reference to a target object via sound changes as the user's observation point moves, comprising the steps of:
   virtually disposing a sound source at the target object in a geographical data field covering the positional arrangement of the user and the target object;
   calculating propagation paths in real time through which sound waves from the target object are propagated to the observation point in the geographical data field, based on geographical conditions defined in the geographical data field; and
   synthesizing and outputting a simulation of sounds as if the target object actually emitted sounds and the sounds were propagated to the user's current observation point, using the calculated propagation paths.

2. The method according to claim 1, wherein the geographical data field is configured based on positional information obtained from a positional information detector.

3. The method according to claim 1, wherein the simulation of sounds are outputted from multiple sound output devices which are disposed in different positions with respect to the positions of the user's ears.

4. The method according to claim 1, wherein the geographical data field corresponds to the real world geographical arrangements, and the target object is the user's destination.

5. The method according to claim 1, wherein multiple target objects are selected, and different sounds are designated to different target objects.

6. The method according to claim 1, which is a simulation method wherein the target object and the user are disposed in virtual space defined by the geographical data field.

7. The method according to claim 1, which is a navigation method wherein the user uses a vehicle, and the observation point is the current position of the vehicle.

8. The method according to claim 1, wherein the simulation of sounds is calculated using indirectly transmitted waves which arrive at the observation points through the propagation paths, or using a combination of the indirectly transmitted waves and directly transmitted waves which are directly propagated to the observation point through the propagated paths.

9. The method according to claim 8, wherein the indirectly transmitted waves are at least either one of (i) diffraction waves which are sound waves from the target object propagated to the observation point while being diffracting by objects or obstacles defined in the geographical data field, or (ii) reflection waves which are sound waves from the target object propagated to the observation point while being reflected by objects or obstacles defined in the geographical data field.

10. The method according to claim 8, wherein the simulation of sounds is formulated further using the Doppler effect.

11. The method according to claim 10, wherein the moving velocity of the user for determining the Doppler effect is measured using a velocity detector.

12. The method according to claim 10, wherein when the distance between the observation point and the target object becomes less than a given range, the Doppler effect is added to formulate the simulation of sounds.

13. A method for guiding a user with reference to a target object via sound changes, comprising the steps of:

configuring a geographical data field in a computer system;

designating a target object in the geographical data field as a sound source;

designating an observation point in the geographical data field;

defining the propagation of sound waves from the sound source to the observation point as a sound signal which is calculated using as a parameter at least a distance from the sound source to the current observation point and further using as a parameter at least one selected from the group consisting of constructions, geographical features, the moving direction of the observation point, and the moving velocity of the observation point defined in the geographical data field;

separating a sound signal arriving at the observation point into multiple audio element signals according to the direction of the sound source observed from the observation point; and reproducing and outputting to the user the multiple audio element signals as a simulation of sounds whereby the user sensorially recognize the position of the target object from the current observation point.

14. The method according to claim 13, wherein the geographical data field is displayed to the user on a display monitor, the user designates the target object on the monitor, the user's position is displayed as the observation point, and the simulation of sounds is outputted from multiple sound output devices installed at positions by which the user can understand the direction of sounds.

15. The method according to claim 13, wherein the position of the user is identified by a Global Positioning System (GPS), and the geographical data field is configured based on real geographical data containing the position of the user and the target object.

16. The method according to claim 13, which is a navigation method wherein the user uses a vehicle, and the observation point is the current position of the vehicle.

17. A position guiding system for guiding a user with reference to a target object via sound changes, comprising: (a) a positional information detector which obtains positional information for locating the position of the user's observation point in a geographical data field; (b) a geographical data field-user interface which virtually disposes a sound source at the target object in a geographical data field; (c) a propagation path calculation unit which identifies propagation paths, through which sound waves from the target object are propagated to the observation point, based on the positional information obtained by the positional information detector, (d) a sound synthesizer which synthesizes a simulation of sounds as if the target object actually emitted sounds and the sounds were propagated to the user's current observation point via the propagation paths, and (e) multiple sound output devices which outputs the synthesized sounds, said multiple sound output devices being arranged in different positions with respect to the positions of the user's ears to enable the user to sensorially recognize the positional arrangement of the target object.

18. The system according to claim 17, wherein the interface is configured to designate multiple target objects and designate different sounds to different target objects.

19. The system according to claim 17, wherein the positional information detector identifies the position of the user using a Global Positioning System (GPS).

20. A position guiding simulation system comprising the system of claim 17, wherein the positional arrangements of the user and the target object are disposed in virtual space.

21. The system according to claim 17, wherein the sound synthesizer calculates the simulation of sounds using indirectly transmitted waves which arrive at the observation points through the propagation paths, or using a combination of the indirectly transmitted waves and directly transmitted waves which are directly propagated to the observation point through the propagated paths.

22. The system according to claim 21, wherein the indirectly transmitted waves are at least either one of (i) diffraction waves which are sound waves from the target object propagated to the observation point while being diffracting by objects or obstacles defined in the geographical data field, or (ii) reflection waves which are sound waves from the target object propagated to the observation point while being reflected by objects or obstacles defined in the geographical data field.

23. The system according to claim 17, further comprising a velocity detector for measuring the moving velocity of the user.

24. The system according to claim 23, wherein the sound synthesizer further determines the Doppler effect based on the moving velocity of the user measured.

25. A sonic navigation system comprising the system of claim 17, which is adapted to be installed in a vehicle operated by the user, wherein the positional information detector detects the position of the vehicle as the user's observation point.

26. The sonic navigation system according to claim 25, wherein the positional information detector configures the geographical data field in a three-dimensional map.

* * * * *